(12) United States Patent
Liang et al.

(10) Patent No.: US 10,919,645 B2
(45) Date of Patent: Feb. 16, 2021

(54) GIMBAL QUICK ASSEMBLY/DISASSEMBLY APPARATUS AND UNMANNED AERIAL VEHICLE HAVING THE SAME

(71) Applicant: AUTEL ROBOTICS CO., LTD., Guangdong (CN)

(72) Inventors: Zhiying Liang, Guangdong (CN); Longxue Qiu, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 428 days.

(21) Appl. No.: 15/958,530

(22) Filed: Apr. 20, 2018

(65) Prior Publication Data
US 2018/0237158 A1      Aug. 23, 2018

Related U.S. Application Data

(63) Continuation of application No. PCT/CN2016/091778, filed on Jul. 26, 2016.

(30) Foreign Application Priority Data

Oct. 28, 2015   (CN) .......................... 201520845452.X

(51) Int. Cl.
*B64D 47/08* (2006.01)
*B64C 39/02* (2006.01)
(Continued)

(52) U.S. Cl.
CPC .............. *B64D 47/08* (2013.01); *B64C 39/02* (2013.01); *B64C 39/024* (2013.01);
(Continued)

(58) Field of Classification Search
CPC ....... B64D 47/08; B64C 39/024; B64C 39/02; B64C 2201/02; B64C 2201/127; G03B 17/561; G03B 15/006; F16M 11/041
See application file for complete search history.

(56) References Cited

U.S. PATENT DOCUMENTS 7,374,351 B2 * 5/2008 Martinez ................ F16M 11/08
                                                                            348/373
9,280,038 B1 * 3/2016 Pan ........................ F16M 11/12
                            (Continued)

FOREIGN PATENT DOCUMENTS

CN       203099236 U     7/2013
CN       203259882 U    10/2013
                        (Continued)

OTHER PUBLICATIONS

Internation Search Report dated Nov. 7, 2016; PCT/CN2016/091778.
Supplementary European Search Report dated Aug. 21, 2018; Appln. No. EP 16 85 8777.

*Primary Examiner* — Brian M O'Hara
*Assistant Examiner* — Keith L Dixon

(57) ABSTRACT

The present application provides a gimbal quick assembly/disassembly apparatus and an unmanned aerial vehicle having the same. The gimbal quick assembly/disassembly apparatus includes a fuselage seat component, a gimbal seat component and a locking component. The fuselage seat component is fixedly mounted on a bearing member, the gimbal seat component is fixedly mounted on a gimbal and the gimbal seat component includes a gimbal seat. The locking component is mounted on the fuselage seat component or on the gimbal seat component and the gimbal seat component and the fuselage seat component are detachably mounted together by using the locking component. The gimbal is detachably mounted on the unmanned aerial vehicle, resolving problems of complex assembled/disassembled operations and low efficiency that are caused when the gimbal is fixedly mounted on the unmanned aerial vehicle and realizing quick assembly/disassembly of the gimbal to/from the unmanned aerial vehicle.

10 Claims, 6 Drawing Sheets

(51) Int. Cl.
*F16M 13/02* (2006.01)
*G03B 17/56* (2021.01)
*F16M 11/04* (2006.01)
*G03B 15/00* (2021.01)

(52) U.S. Cl.
CPC .......... *F16M 11/041* (2013.01); *F16M 13/02* (2013.01); *G03B 17/561* (2013.01); *B64C 2201/02* (2013.01); *B64C 2201/127* (2013.01); *G03B 15/006* (2013.01)

(56) References Cited

U.S. PATENT DOCUMENTS

| | | | |
|---|---|---|---|
| 9,736,376 B1* | 8/2017 | Holway | F16M 11/041 |
| 2007/0036539 A1 | 2/2007 | Martinez et al. | |
| 2014/0336848 A1 | 11/2014 | Saund et al. | |
| 2017/0108161 A1* | 4/2017 | Zhao | G03B 17/561 |
| 2017/0168375 A1* | 6/2017 | Lajoie | F16M 11/16 |
| 2017/0174362 A1* | 6/2017 | Zhao | G03B 15/006 |
| 2017/0198747 A1* | 7/2017 | Chen | F16C 11/06 |
| 2017/0227162 A1* | 8/2017 | Saika | H04N 7/183 |
| 2018/0194488 A1* | 7/2018 | Zhao | B64C 39/024 |
| 2019/0373173 A1* | 12/2019 | Wang | B64D 47/08 |
| 2019/0382133 A1* | 12/2019 | Zhang | B64C 39/024 |

FOREIGN PATENT DOCUMENTS

| | | |
|---|---|---|
| CN | 203996915 U | 12/2014 |
| CN | 104386249 A | 3/2015 |
| CN | 204250379 U | 4/2015 |
| CN | 104696690 A | 6/2015 |
| CN | 204494013 U | 7/2015 |
| CN | 204592779 U | 8/2015 |
| CN | 105042299 A | 11/2015 |
| CN | 205076056 U | 3/2016 |

* cited by examiner

GIMBAL QUICK ASSEMBLY/DISASSEMBLY APPARATUS AND UNMANNED AERIAL VEHICLE HAVING THE SAME

CROSS-REFERENCE

This application is a continuation application of International Application No. PCT/CN2016/091778, filed 26 Jul. 2016, which is incorporated herein by reference in its entirety.

BACKGROUND

Technical Field

The present application relates to the field of gimbals, and in particular, to a gimbal quick assembly/disassembly apparatus and an unmanned aerial vehicle having the same.

Related Art

Gimbals serving as support devices for mounting, fixing electrical devices such as video cameras are mounted on bearing members and are widely applied to the fields of shooting, photography, monitoring and the like. In the application domain of unmanned aerial vehicle technologies, a gimbal is generally fixed on a fuselage of an unmanned aerial vehicle serving as a bearing member and a photographing device (for example a camera and a video camera) used for aerial photography is carried on the gimbal, to obtain a particular type of environment information (for example, a remote sensing image).

Generally, a gimbal in the prior art is directly fixedly connected to an unmanned aerial vehicle and the gimbal and the unmanned aerial vehicle are locked and fixed by using screws for most cases. For the convenience of transportation, the gimbal and a shooting device are both mounted onto the unmanned aerial vehicle before a task is executed and only a photographing device on which a thread hole with a particular specification is configured can be fit with the gimbal. On one hand, such an assembly structure reduces the universality of the gimbal. On the other hand, assembly/disassembly operations are complex and the efficiency is low. In addition, multiple times of assembly/disassembly further cause excessive wear on a thread and the durability is poor. Consequently, this affects the speed of executing a task by the unmanned aerial vehicle.

SUMMARY

In view of this, a technical problem to be resolved in the present application is to resolve technical problems in the prior art that the universality of a gimbal is poor, assembly/disassembly operations of a photographing device are complex and the efficiency is low.

To achieve the foregoing objective, the present application provides a gimbal quick assembly/disassembly apparatus, including a fuselage seat component, a gimbal seat component and a locking component, where the fuselage seat component is fixedly mounted on a bearing member, the gimbal seat component is fixedly mounted on a gimbal and the gimbal seat component includes a gimbal seat; and wherein the locking component is mounted on the fuselage seat component or on the gimbal seat component and the gimbal seat component and the fuselage seat component are detachably mounted together by using the locking component, so that the gimbal is detachably mounted on the bearing member.

Preferably, the fuselage seat component includes a fuselage seat having a fuselage seat receiving groove with an opening towards the gimbal seat, the gimbal seat being movably received in the fuselage seat receiving groove and the locking component being mounted on the fuselage seat.

Preferably, the fuselage seat component includes a fuselage seat having a gimbal seat receiving groove with an opening towards the fuselage seat, the fuselage seat being movably received in the gimbal seat receiving groove and the locking component being mounted on the gimbal seat.

Preferably, a key hole passing through an outer wall of the gimbal seat is provided outward on a side wall of the gimbal seat receiving groove and a fixing post protrudes outward from an inner wall of the gimbal seat receiving groove; and wherein the locking component includes a key and a torsional spring, the key being movably inserted into the key hole, the torsional spring being sleeved over the fixing post and a rotary arm at an end of the torsional spring abutting against the key, so that the key is capable of restoring to an initial position on the act of the rotary arm after being pushed inward.

Preferably, the key has a vertical board-shaped baffle and the middle of a side surface of the baffle horizontally extends outward to form a substrate, the substrate being provided with a locking slot; and wherein a lock core which corresponds to the key protrudes outward from a surface of the fuselage seat which faces the gimbal seat and the lock core is slidably clamped in the locking slot, so that the fuselage seat is movably assembled/disassembled in the gimbal seat receiving groove.

Preferably, a pressing direction of the key is a direction A, an opening direction of the locking slot is a direction B perpendicular to a movement direction of the key, and wherein the mounting direction of the gimbal seat is the same as the opening direction of the locking slot and the disassembling direction of the gimbal seat is opposite to the opening direction of the locking slot, that is, the assembling/disassembling direction of the gimbal seat is inconsistent with the pushing direction of the key.

Preferably, the gimbal seat receiving groove is mounted on a side wall of the key and several guide blocks extend inward from a side wall opposite to the side wall; and positions of the fuselage seat corresponding the guide blocks on the gimbal seat extend outward to form several guide slots and the guide blocks slide in the guide slots, so that the gimbal is accurately mounted by sliding.

Preferably, the fuselage seat component further includes a fuselage circuit switching board, which is mounted on the fuselage seat; and wherein the gimbal seat component further includes a gimbal circuit switching board, which is mounted on the gimbal seat and when the gimbal seat component is mounted on the fuselage seat component, the fuselage circuit switching board and the gimbal circuit switching board are in electrical contact, to implement signal transfer.

Preferably, an accommodating slot is formed in the mounting face of the fuselage seat of the fuselage seat component which is located on the bearing member, by being recessed inward the mounting face, the fuselage circuit switching board being received in the accommodating slot; and wherein a mounting slot is formed in the mounting face of the gimbal seat of the gimbal seat component which is located on the gimbal, by being recessed inward the mounting face, the gimbal circuit switching board being mounted in the mounting slot.

Preferably, a bottom wall of the accommodating slot is provided with a first through hole passing through an outer surface of the fuselage seat, and bottom wall of the mounting slot is provided with a second through hole passing through the gimbal seat receiving groove, and when the gimbal seat component is mounted on the fuselage seat component, the fuselage circuit switching board and the gimbal circuit switching board are in electrical contact through the first through hole and the second through hole.

Preferably, several conductive contacts are disposed on a side of the fuselage circuit switching board which faces the gimbal circuit switching board, and several on-touch elastic pieces which correspond to the conductive contacts of the fuselage circuit switching board are disposed on a side of the gimbal circuit switching board which faces the fuselage circuit switching board and wherein when the gimbal seat component is mounted on the fuselage seat component, the on-touch elastic pieces and the conductive contacts are in electrical contact.

Preferably, the fuselage seat component further includes a cable-clamp cover plate, which is mounted on the fuselage seat and covers the fuselage circuit switching board, and wherein the cable-clamp cover plate is provided with a hook, so that flat cables on the bearing member are connected to an external radar through the hook.

To achieve the foregoing objective, the present application further provides an unmanned aerial vehicle, including the gimbal quick assembly/disassembly apparatus according to any of the foregoing descriptions and a photographing apparatus, the photographing apparatus being disposed on the gimbal and the bearing member being a fuselage of the unmanned aerial vehicle.

The gimbal quick assembly/disassembly apparatus and the unmanned aerial vehicle having the same that are provided in the present application have the following advantages:

1. According to the gimbal quick assembly/disassembly apparatus provided in the present application, the gimbal seat component and the fuselage seat component are detachably mounted together by using the locking component, so that the gimbal is detachably mounted on the bearing member, resolving the problems of complex assembled/disassembled operations and low efficiency that are caused when the gimbal is fixedly mounted on the bearing member and realizing quick assembly/disassembly of the gimbal to/from the bearing member. The structure design is simple. It is convenient to operate and the connecting performance is reliable.

2. According to the gimbal quick assembly/disassembly apparatus provided in the present application, when the gimbal is quickly assembled to/disassembled from the bearing member, the lock core cooperates with the torsional spring to slidably clamp the in-and-out locking slot, so as to lock and disassemble the gimbal seat component. In addition, the guide block of the gimbal seat slides in the guide slot of the fuselage seat, so that the fuselage seat is movably assembled in/disassembled from the gimbal seat receiving groove and the gimbal is quickly assembled/disassembled.

3. According to the gimbal quick assembly/disassembly apparatus provided in the present application, the several conductive contacts are disposed on the fuselage circuit switching board. The several on-touch elastic pieces are disposed on the gimbal circuit switching board in correspondence with the conductive contacts of the fuselage circuit switching board. When the gimbal seat component is mounted on the fuselage seat component, the on-touch elastic pieces and the conductive contacts are in electrical contact, to implement signal transfer between the gimbal seat component and the fuselage seat component.

4. According to the unmanned aerial vehicle provided in the present application, since the gimbal quick assembly/disassembly apparatus is adopted, wherein the fuselage seat component is fixedly mounted on a main body of the unmanned aerial vehicle, the gimbal seat component is fixedly mounted on the gimbal and the gimbal seat component and the fuselage seat component are detachably mounted together by using the locking component, the gimbal is detachably mounted on the unmanned aerial vehicle. Therefore, the problems of complex assembled/disassembled operations and low efficiency that are caused when the gimbal is fixedly mounted on the unmanned aerial vehicle are resolved and the quick assembly/disassembly of the gimbal with respect to the unmanned aerial vehicle is realized. A structure design is simple. It is convenient to operate and the connecting performance is reliable.

BRIEF DESCRIPTION OF THE DRAWINGS

To describe the technical solutions in specific implementations of the present application more clearly, the following further describes the present application in detail according to the specific embodiments of the present application with reference to the accompanying drawings.

DESCRIPTIONS OF THE REFERENCE NUMERALS IN THE FIGURES

10: Fuselage seat component; 11: Fuselage seat; 111: Lock core; 112: Installation sign;
113: Guide slot; 114: Accommodating slot; 115: First through hole; 12: Fuselage circuit switching board;
121: Conductive contact; 122: Connector; 13: Cable-clamp cover plate; 31: Hook;
120: Gimbal seat component; 21: Gimbal seat; 211: Gimbal seat receiving groove; 212: Key hole;
213: Fixing post; 14: Installation sign; 215: Guide block; 216: Mounting slot; 217: Second through hole;

22: Gimbal circuit switching board; 221: On-touch elastic piece; 222: Connector; 30: Locking component;
31—Key; 311: Baffle; 312: Substrate; 3121: Locking slot;
32: Torsional spring; 321: Rotary arm;
200: Bearing member; 300: Gimbal

DETAILED DESCRIPTION

The following clearly and completely describes the technical solutions in the present application with reference to the accompanying drawings. Apparently, the described embodiments are some of the embodiments of the present application rather than all of the embodiments. All other embodiments obtained by a person of ordinary skill in the art based on the embodiments of the present application without creative efforts shall fall within the protection scope of the present application.

In the description of the present application, it should be noted that directions or position relationships indicated by terms such as "above", "vertical", "horizontal", "inside" and "outside" are directions or position relationships based on the accompanying drawings. The terms are merely used for ease of description and simplification of the present application, but are not intended to indicate or imply that an indicated apparatuses or element necessarily has a particular direction and is constructed and operated in a particular direction and therefore, cannot be understood as limitations to the present application. In addition, the terms such as "first" and "second" are merely used to describe objectives and should not be understood as indication or implication of relative importance.

In the descriptions of the present application, it should be noted that unless otherwise explicitly specified and defined, terms such as "mount" and "connect" should be understood broadly. For example, a connection may be a detachable connection or an integral connection. A person of ordinary skill in the art may understand a specific meaning of the foregoing terms in the present application according to specific conditions.

In addition, technical features included in the different implementations of the present application that are described below may be combined with each other provided that there is no conflict.

Embodiment 1

Figure 1:
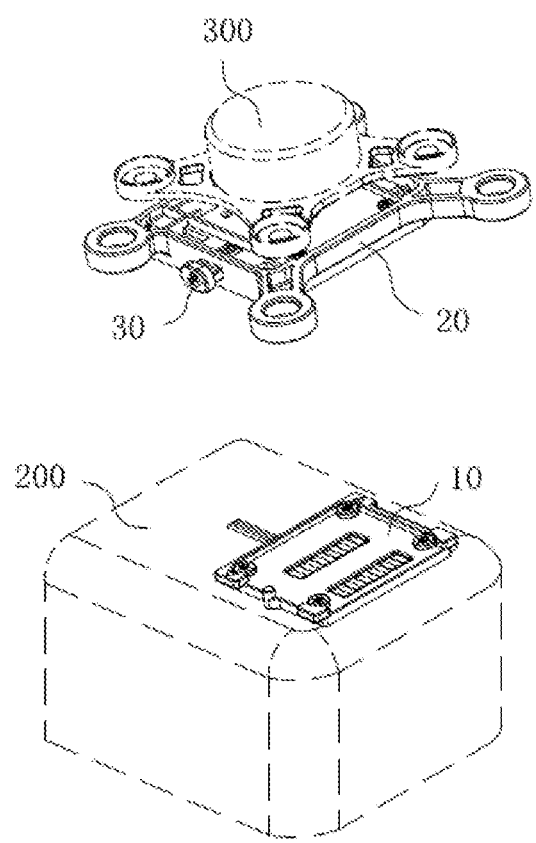
FIG. 1 is a schematic diagram in which the fuselage seat component of the gimbal quick assembly/disassembly apparatus of the present application is mounted on the bearing member and the gimbal seat component of the gimbal quick assembly/disassembly apparatus of the present application is mounted on the gimbal, respectively.
Figure 2:
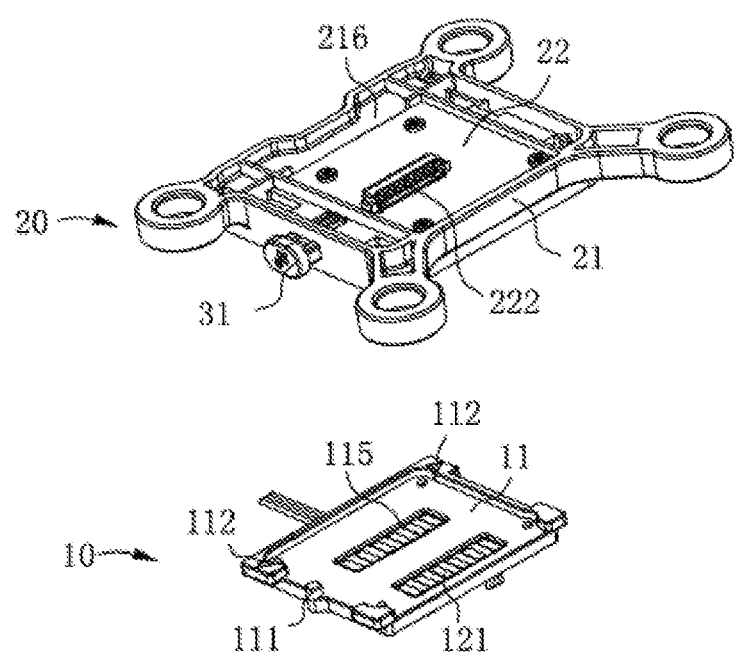
FIG. 2 is a three-dimensional diagram of an implementation of the gimbal quick assembly/disassembly apparatus shown in FIG. 1.

The gimbal quick assembly/disassembly apparatus provided in this embodiment is applicable to assembly/disassembly of the gimbal 300 on the bearing member 200. For example, the gimbal quick assembly/disassembly apparatus is applicable to an unmanned aerial vehicle, to implement quick assembly/disassembly of the gimbal to/from the unmanned aerial vehicle. Certainly, the gimbal quick assembly/disassembly apparatus may also be used for another device, such as a vehicle or a security device. This is not limited. As shown in FIG. 1 and FIG. 2, the gimbal quick assembly/disassembly apparatus includes a fuselage seat component 10, a gimbal seat component 20 and a locking component 30. The fuselage seat component 10 is fixedly mounted on a bearing member 200. The gimbal seat component 20 is fixedly mounted on a gimbal 300. The gimbal seat component 20 includes a gimbal seat 21. The locking component 30 is mounted on the fuselage seat component 10 or the gimbal seat component 20. The gimbal seat component 20 and the fuselage seat component 10 are detachably mounted together by using the locking component 30, so that the gimbal 300 is detachably mounted on the bearing member 200.

According to the foregoing gimbal quick assembly/disassembly apparatus, the gimbal seat component 20 and the fuselage seat component 10 are detachably mounted together by using the locking component, so that the gimbal 300 is detachably mounted on the bearing member 200, resolving problems of complex assembled/disassembled operations and low efficiency that are caused when the gimbal 300 is fixedly mounted on the bearing member 200 and realizing quick assembly/disassembly of the gimbal 300 to/from the bearing member 200. The structure design is simple. It is convenient to operate and the connecting performance is reliable.

Figure 3:
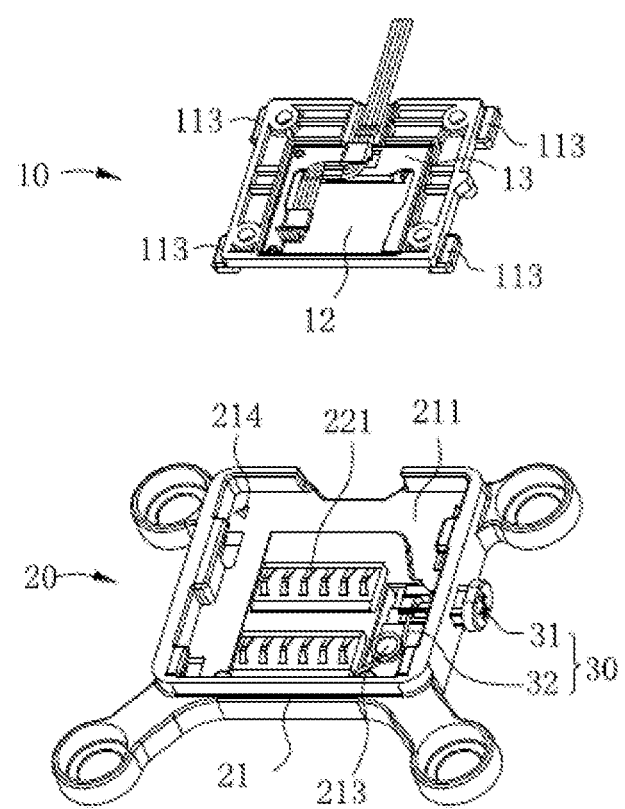
FIG. 3 is a three-dimensional diagram from another perspective of the gimbal quick assembly/disassembly apparatus shown in FIG. 2.

As shown in FIG. 1 and FIG. 3, in this embodiment, the fuselage seat component 10 includes a fuselage seat 11. The gimbal seat 21 has a gimbal seat receiving groove 211 with an opening facing towards the fuselage seat 11. The fuselage seat 11 is movably received in the gimbal seat receiving groove 211. The locking component 30 is mounted on the gimbal seat 21.

In a variant implementation, the gimbal seat 21 may alternatively be received in the fuselage seat 11. Specifically, the fuselage seat 11 has a fuselage seat receiving groove with an opening facing towards the gimbal seat 21. The gimbal seat 21 is movably received in the fuselage seat receiving groove. The locking component 30 is mounted on the fuselage seat 11.

Figure 4:
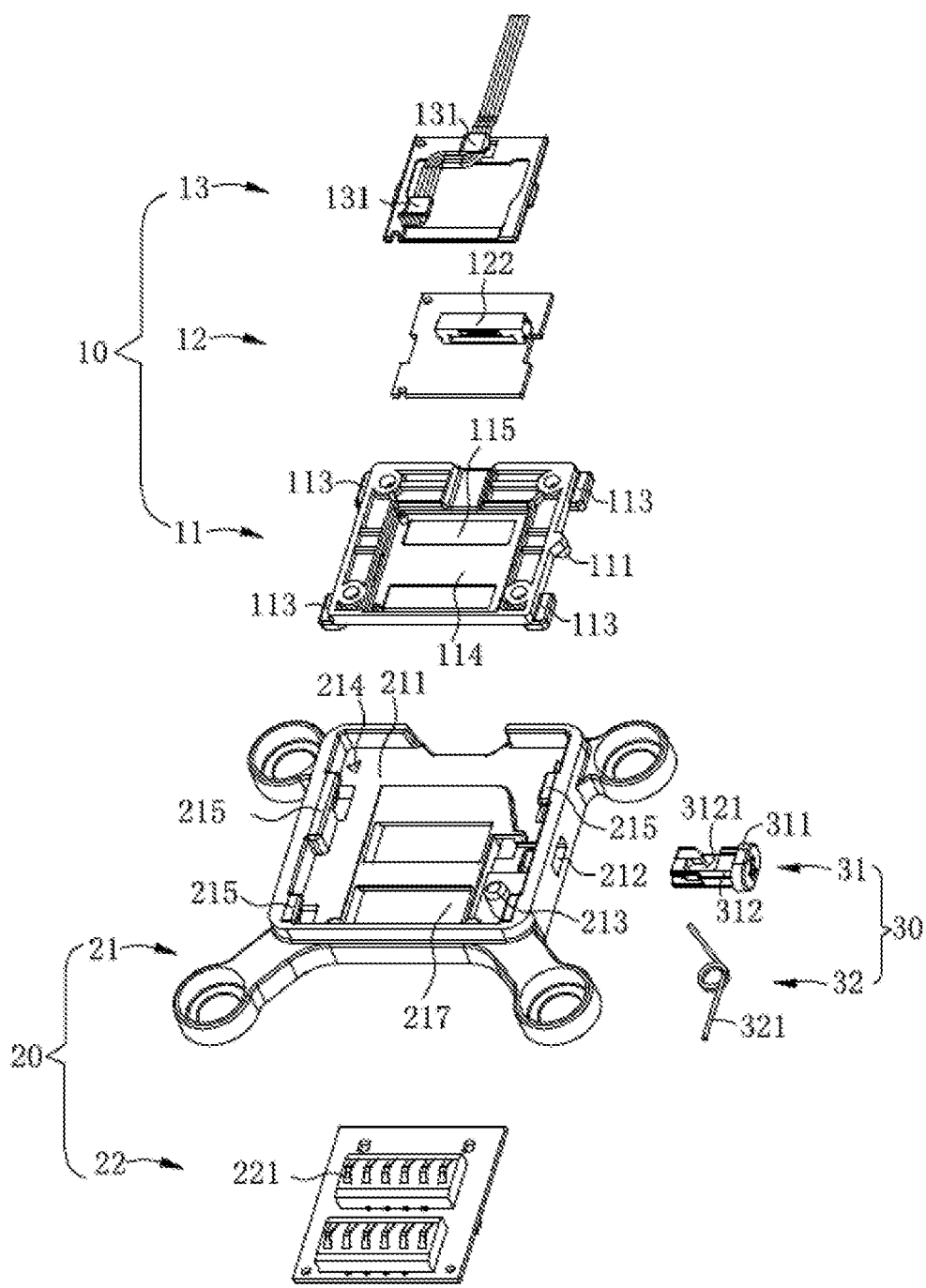
FIG. 4 is an exploded diagram of the gimbal quick assembly/disassembly apparatus shown in FIG. 3.

In a preferred implementation, as shown in FIG. 3 and FIG. 4, a key hole 212 passing through an outer wall of the gimbal seat 21 is provided outward on a side wall of the gimbal seat receiving groove 211. A fixing post 213 protrudes outward from an inner wall of the gimbal seat receiving groove 211. The locking component 30 includes a key 31 and a torsional spring 32, the key 31 being movably inserted into the key hole 212 and the torsional spring 32 being sleeved over the fixing post 213. A rotary arm 321 at an end of the torsional spring 32 abuts against the key 31, so that the key 31 is capable of restoring to an initial position on the act of the rotary arm 321 after being pushed inward.

In a preferred implementation, as shown in FIG. 4, the key 31 has a vertical board-shaped baffle 311 and the middle of a side surface of the baffle 311 horizontally extends outward to form a substrate 312. The substrate 312 is provided with a locking slot 3121. The locking slot is L-shaped. A lock core 111 protrudes outward from a surface of the fuselage seat 11 towards the gimbal seat 21 corresponding to the key 31 and the lock core 111 is slidably clamped in the locking slot 3121, so that the fuselage seat 11 is movably assembled/disassembled in the gimbal seat receiving groove 211.

In a variant implementation, the locking component 30 and the lock core 111 may also be an integral locking component, to implement unlocking and locking functions. A person of ordinary skill in the art may further make other different forms of changes or variations based on the key 31, the torsional spring 32 and the lock core 111. All implementations do not need to and cannot be exhaustively listed herein.

In a preferred implementation, as shown in FIG. 2 and FIG. 3, a surface of the fuselage seat 11 towards the gimbal seat 21 is provided with an installation sign 112. A bottom wall of the gimbal seat receiving groove 211 of the gimbal seat 21 is also provided with an installation sign 214 in correspondence with the installation sign 112 on the fuselage seat 11. During mounting, a user may understand a relative mounting position relationship between the fuselage seat 11 and the gimbal seat 21 according to only the corresponding installation sign 112 on the fuselage seat 11 and the corresponding installation sign 214 on the gimbal seat 21. This is convenient for use by a user.

Figure 5:
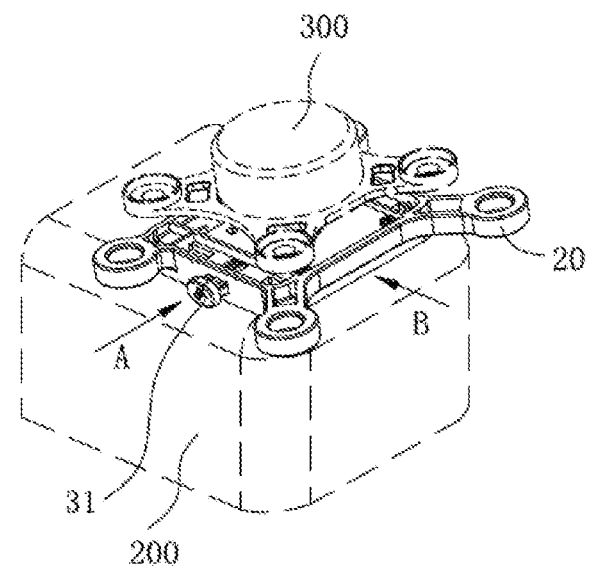
FIG. 5 is a schematic diagram of the gimbal quick assembly/disassembly apparatus shown in FIG. 2 in which the gimbal is mounted on the bearing member.

In a preferred implementation, as shown in FIG. 4, several guide blocks 215 extend inward from a side wall of the gimbal seat receiving groove 211 of the gimbal seat 21 according to a direction in which the lock core 111 slides out of the locking slot 3121. As shown in FIG. 4 and FIG. 5, a pressing direction of the key 31 is direction A, and an opening direction of the locking slot 3121 is direction B perpendicular to a movement direction of the key 31. The mounting direction of the gimbal seat 21 is the same as the opening direction of the locking slot 3121. The disassembling direction of the gimbal seat 21 is opposite to the opening direction of the locking slot 3121, that is, the assembling/disassembling direction of the gimbal seat 21 is inconsistent with the pushing direction of the key 31. The gimbal seat receiving groove 211 is mounted on a side wall of the key 31 and the several guide blocks 215 extend inward from a side wall opposite to the side wall. The guide blocks 215 are arranged in the direction B. As shown in FIG. 3, positions of the fuselage seat 11 corresponding the guide blocks 215 on the gimbal seat 21 extend outward to form several guide slots 113. When the gimbal seat 21 is assembled/disassembled, the guide blocks 215 slide in the guide slots 113, so that the gimbal 300 is accurately assembled/disassembled by sliding.

Figure 6:
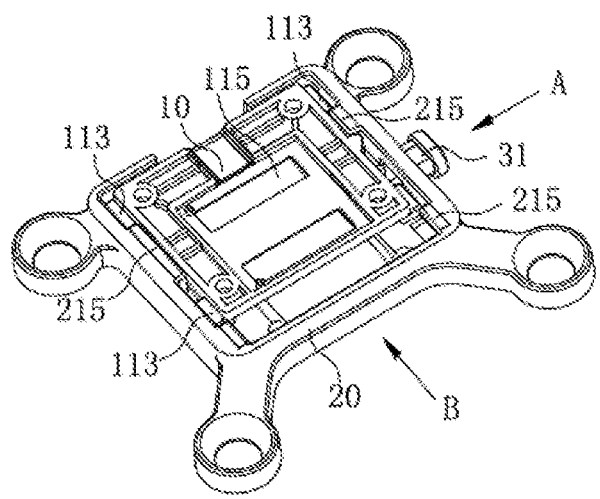
FIG. 6 is a schematic diagram of a relative position when the fuselage seat is not locked by the gimbal seat of the gimbal quick assembly/disassembly apparatus shown in FIG. 5.
Figure 7:
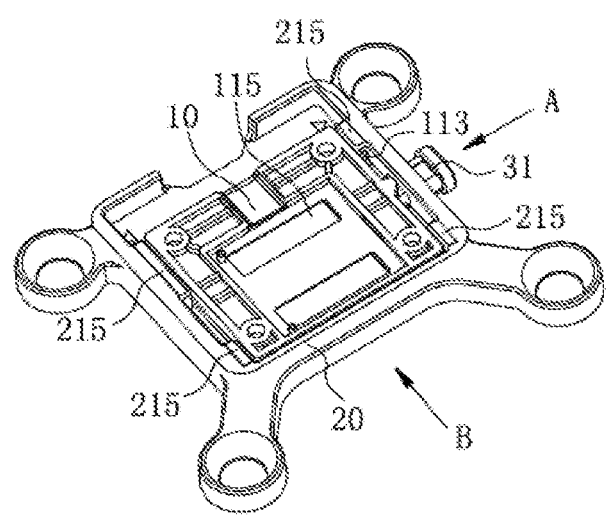
FIG. 7 is a schematic diagram of a relative position when the fuselage seat is locked by the gimbal seat of the gimbal quick assembly/disassembly apparatus shown in FIG. 5.

When the gimbal quick assembly/disassembly apparatus in this embodiment is mounted, firstly, the fuselage seat 11 and the gimbal seat 21 are relatively placed according to installation sign 112 on the fuselage seat 11 and the installation sign 214 on the gimbal seat 21, as shown in FIG. 6. Then, the key 31 on the gimbal seat 21 is pressed along the direction A, so that the gimbal seat 21 covers the fuselage seat 11. And the gimbal seat 21 slides along the direction B, so that the guide block 215 on the gimbal seat 21 slides into the guide slot 113 on the fuselage seat 11, as shown in FIG. 7. Finally, the key 31 is released and a tail end of the substrate 312 of the key 31 returns to an initial position on the act of the rotary arm 321 of the torsional spring 32. In this case, the lock core 111 is clamped in the locking slot 3121.

Steps of disassembling the gimbal 300 from the gimbal quick assembly/disassembly apparatus in this embodiment are opposite to the steps during mounting. Firstly, the key 31 on the gimbal seat 21 is pressed along the direction A, so that the tail end of the substrate 312 of the key 31 abuts against the rotary arm 321 of the torsional spring 32 and the lock core 111 slides to an opening of the locking slot 3121 at the same time. Then, the gimbal seat 21 slides along a direction opposite to the direction B. The lock core 111 slides out of the locking slot 3121 from the opening of the locking slot 3121 of the key 31 and the guide block 215 slides out of the guide slot 113 along the direction B, so that the gimbal seat 21 and the fuselage seat 11 are separated to realize quickly disassembly of the gimbal 300.

In a preferred implementation, as shown in FIG. 2 and FIG. 3, the fuselage seat component 10 further includes a fuselage circuit switching board 12 and a cable-clamp cover plate 13. The fuselage circuit switching board 12 and the cable-clamp cover plate 13 are mounted on the fuselage seat 11. The gimbal seat component 20 further includes a gimbal circuit switching board 22, which is mounted on the gimbal seat 21. When the gimbal seat component 20 is mounted on the fuselage seat component 10, the fuselage circuit switching board 12 and the gimbal circuit switching board 22 are in electrical contact, to implement signal transfer.

Specifically, as shown in FIG. 2 to FIG. 4, an accommodating slot 114 is formed in the mounting face of the fuselage seat 11 of the fuselage seat component 10 which is located on the bearing member 200, by being recessed inward the mounting face. The bottom wall of the accommodating slot 114 is provided with a first through hole 115 passing through an outer surface of the fuselage seat 11. A mounting slot 216 is formed in the mounting face of the gimbal seat 21 of the gimbal seat component 20 which is located on the gimbal 300, by being recessed inward the mounting face. The bottom wall of the mounting slot 216 is provided with a second through hole 217 passing through the gimbal seat receiving groove 211. The fuselage circuit switching board 12 and the cable-clamp cover plate 13 are received in the accommodating slot 114. The cable-clamp cover plate 13 covers the fuselage circuit switching board 12. The gimbal circuit switching board 22 is mounted in the mounting slot 216. When the gimbal seat component 20 is mounted on the fuselage seat component 10, the fuselage circuit switching board 12 and the gimbal circuit switching board 22 are in electrical contact through the first through hole 115 and the second through hole 217.

In a preferred implementation, as shown in FIG. 2 and FIG. 3, several conductive contacts 121 are disposed on a side of the fuselage circuit switching board 12 which faces the gimbal circuit switching board 22. Several on-touch elastic pieces 221 which correspond to the conductive contacts 121 of the fuselage circuit switching board 12 are disposed on a side of the gimbal circuit switching board 22 which faces the fuselage circuit switching board 12. When the gimbal seat component 20 is mounted on the fuselage seat component 10, the on-touch elastic pieces 221 and the conductive contacts 121 are in electrical contact.

In a variant implementation, the foregoing electrical connecting manner between the fuselage circuit switching board 12 and the gimbal circuit switching board 22 adopts the conductive contact 121 and the on-touch elastic piece 221, or a connection to an elastic piece, a connection to a conductive terminal, or a connection to a connector or anther manner may be used.

In a preferred implementation, as shown in FIG. 2 and FIG. 4, a connector 122 is disposed on a surface of the fuselage circuit switching board 12 which faces the bearing member 200, to implement signal transfer between the fuselage circuit switching board 12 and the bearing member 200. The cable-clamp cover plate 13 is provided with a hook 131. The remaining flat cables on the bearing member 200 are collected and arranged through the hook 131 and are connected to an external radar. A connector 222 is disposed on a surface of the gimbal circuit switching board 22 which faces the gimbal 300, to implement signal transfer between the gimbal circuit switching board 22 and the gimbal 300.

Embodiment 2

This embodiment provides an unmanned aerial vehicle, including the gimbal quick assembly/disassembly apparatus according to any of the descriptions recorded in Embodiment 1 and a photographing apparatus. The photographing apparatus is disposed on the gimbal 300. The bearing member 200 is a fuselage of the unmanned aerial vehicle.

Since the foregoing unmanned aerial vehicle adopts the gimbal quick assembly/disassembly apparatus in Embodiment 1 to fixedly mount the fuselage seat component 10 onto a main body of the unmanned aerial vehicle, and the gimbal seat component 20 is fixedly mounted on the gimbal 300 and the gimbal seat component 20 and the fuselage seat component 10 are detachably mounted together by using the locking component 30, the gimbal 300 is detachably mounted on the unmanned aerial vehicle, resolving problems of complex assembled/disassembled operations and low efficiency that are caused when the gimbal 300 is fixedly mounted on the unmanned aerial vehicle and realizing quick assembly/disassembly of the gimbal 300 to/from the unmanned aerial vehicle. The structure design is simple. It is convenient to operate and the connecting performance is reliable.

Apparently, the foregoing embodiments are merely examples used for clear descriptions and are not intended to limit the implementations. A person of ordinary skill in the art may further make other different forms of changes or variations based on the foregoing descriptions. All implementations do not need to and cannot be exhaustively listed herein. However, obvious derived variations or modifications shall fall in the protection scope of the present application.

What is claimed is:

1. A gimbal quick assembly/disassembly apparatus, comprising a fuselage seat component, a gimbal seat component and a locking component, wherein the fuselage seat component is fixedly mounted on a bearing member, the gimbal seat component is fixedly mounted on a gimbal and the gimbal seat component comprises a gimbal seat; and wherein the locking component is mounted on the fuselage seat component or on the gimbal seat component and the gimbal seat component and the fuselage seat component are detachably mounted together by using the locking component, so that the gimbal is detachably mounted on the bearing member, wherein the fuselage seat component comprises a fuselage seat having a gimbal seat receiving groove with an opening towards the fuselage seat, the fuselage seat being movably received in the gimbal seat receiving groove and the locking component being mounted on the gimbal seat.

2. The gimbal quick assembly/disassembly apparatus according to claim 1, wherein a key hole passing through an outer wall of the gimbal seat is provided outward on a side wall of the gimbal seat receiving groove and a fixing post protrudes outward from an inner wall of the gimbal seat receiving groove; and wherein the locking component comprises a key and a torsional spring, the key being movably inserted into the key hole, the torsional spring being sleeved over the fixing post and a rotary arm at an end of the torsional spring abutting against the key, so that the key is capable of restoring to an initial position on the act of the rotary arm after being pushed inward.

3. The gimbal quick assembly/disassembly apparatus according to claim 2, wherein the key has a vertical board-shaped baffle and the middle of a side surface of the baffle horizontally extends outward to form a substrate, the substrate being provided with a locking slot; and wherein a lock core which corresponds to the key protrudes outward from a surface of the fuselage seat which faces the gimbal seat and the lock core is slidably clamped in the locking slot, so that the fuselage seat is movably assembled/disassembled in the gimbal seat receiving groove.

4. The gimbal quick assembly/disassembly apparatus according to claim 3, wherein a pressing direction of the key is direction A, an opening direction of the locking slot is direction B perpendicular to a movement direction of the key, and wherein the mounting direction of the gimbal seat is the same as the opening direction of the locking slot and the disassembling direction of the gimbal seat is opposite to the opening direction of the locking slot, that is, the assembling/disassembling direction of the gimbal seat is inconsistent with the pushing direction of the key.

5. The gimbal quick assembly/disassembly apparatus according to claim 2, wherein the gimbal seat receiving groove is mounted on a side wall of the key and several guide blocks extend inward from a side wall opposite to the side wall; and positions of the fuselage seat corresponding the guide blocks on the gimbal seat extend outward to form several guide slots and the guide blocks slide in the guide slots, so that the gimbal is accurately mounted by sliding.

6. The gimbal quick assembly/disassembly apparatus according to claim 1, wherein the fuselage seat component further comprises a fuselage circuit switching board, which is mounted on the fuselage seat; and wherein the gimbal seat component further comprises a gimbal circuit switching board, which is mounted on the gimbal seat and when the gimbal seat component is mounted on the fuselage seat component, the fuselage circuit switching board and the gimbal circuit switching board are in electrical contact, to implement signal transfer.

7. The gimbal quick assembly/disassembly apparatus according to claim 6, wherein an accommodating slot is formed in the mounting face of the fuselage seat of the fuselage seat component which is located on the bearing member, by being recessed inward the mounting face, the fuselage circuit switching board being received in the accommodating slot; and wherein a mounting slot is formed in the mounting face of the gimbal seat of the gimbal seat component which is located on the gimbal, by being recessed inward the mounting face, the gimbal circuit switching board being mounted in the mounting slot.

8. The gimbal quick assembly/disassembly apparatus according to claim 7, wherein a bottom wall of the accommodating slot is provided with a first through hole passing through an outer surface of the fuselage seat, and a bottom wall of the mounting slot is provided with a second through hole passing through the gimbal seat receiving groove, and when the gimbal seat component is mounted on the fuselage seat component, the fuselage circuit switching board and the gimbal circuit switching board are in electrical contact through the first through hole and the second through hole.

9. The gimbal quick assembly/disassembly apparatus according to claim 7, wherein several conductive contacts are disposed on a side of the fuselage circuit switching board which faces the gimbal circuit switching board, and several on-touch elastic pieces which correspond to the conductive contacts of the fuselage circuit switching board are disposed on a side of the gimbal circuit switching board which faces the fuselage circuit switching board and wherein when the gimbal seat component is mounted on the fuselage seat component, the on-touch elastic pieces and the conductive contacts are in electrical contact.

10. The gimbal quick assembly/disassembly apparatus according to claim 6, wherein the fuselage seat component further comprises a cable-clamp cover plate, which is mounted on the fuselage seat and covers the fuselage circuit switching board, and wherein the cable-clamp cover plate is provided with a hook and the remaining flat cables on the bearing member are collected and arranged through the hook and are connected to an external radar.

* * * * *